United States Patent [19]
Keys

[11] Patent Number: 5,217,786
[45] Date of Patent: Jun. 8, 1993

[54] GLASS RUN STRIP WITH CHAMFERED EDGE TRANSITION

[75] Inventor: James F. Keys, West Bloomfield, Mich.

[73] Assignee: The Standard Products Company, Cleveland, Ohio

[21] Appl. No.: 593,673

[22] Filed: Oct. 5, 1990

[51] Int. Cl.⁵ .............................................. E06B 7/16
[52] U.S. Cl. .................................... 428/122; 49/440; 49/490.1
[58] Field of Search ............... 49/440, 441, 490, 491; 296/146 R; 428/122, 358

[56] References Cited

U.S. PATENT DOCUMENTS

| | | | |
|---|---|---|---|
| 4,188,765 | 2/1980 | Jackson | 428/122 X |
| 4,311,747 | 1/1982 | Kruschwitz | 428/122 |
| 4,409,756 | 10/1983 | Audenino et al. | 49/490 X |
| 4,631,865 | 12/1986 | Motonami et al. | 49/440 X |
| 4,663,888 | 5/1987 | Okamoto | 49/441 |
| 4,817,336 | 4/1989 | Kisanuki | 428/122 X |
| 4,843,759 | 7/1989 | Kisanuki et al. | 49/490 X |
| 4,875,307 | 10/1989 | Barbero | 49/488 X |
| 4,910,918 | 3/1990 | Naples et al. | 49/441 |
| 4,913,976 | 4/1990 | Brooks et al. | 428/122 X |
| 4,923,759 | 5/1990 | Brooks et al. | 428/521 |
| 4,932,161 | 6/1990 | Keys et al. | 49/491 |
| 4,951,418 | 8/1990 | Keys | 49/490 |
| 5,003,792 | 4/1991 | Mesnel et al. | 49/475 X |
| 5,013,379 | 5/1991 | Brooks et al. | 428/494 X |
| 5,016,394 | 5/1991 | Iida et al. | 49/489 X |
| 5,054,242 | 10/1991 | Keys et al. | 49/491 |
| 5,095,656 | 3/1992 | Keys | 49/491 X |

Primary Examiner—Henry F. Epstein

[57] ABSTRACT

A glass run channel strip for providing an improved chamfered surface transition from an end flange of a vehicle to a slidable window pane, said glass run strip comprising a core member, a first chamfer forming lip portion extending from the core member in a direction toward the glass run channel and normally positioned at an angle to a window pane, said first lip portion including an outer surface for forming a chamfered surface between the end flange and the window pane, said lip portion being under cut at its attachment to the core member for allowing flexible hinging of the lip portion, wherein a second lip portion extending into the glass run channel, said second lip portion for deflecting the window pane during movement of the window pane relative to the strip away from the end flange to an extend which ensures that the first lip portion will hinge to its normal position for forming the chamfered surface transition.

10 Claims, 3 Drawing Sheets

GLASS RUN STRIP WITH CHAMFERED EDGE TRANSITION

BACKGROUND OF THE INVENTION

The present invention relates to a glass run weatherstrip. More specifically, the present invention relates to a glass run weatherstrip which has an improved chamfered surface between a door surface and a window pane and is particularly useful around the header portion of a door.

In recent years, because of styling considerations and aerodynamic purposes, it has been a trend in the automotive industry and the design of vehicles to provide crisp transitions from window apertures and the like to outer finished surfaces of the door, for instance. The use of glass run strips providing a small chamfered edge along vertical strips in 'B' pillar constructions have been utilized. While this effect has been readily available in 'B' pillars, it has been problematic in providing such a small transition edge at the header portion of the door. This is at least partially because of the angle of approach of the window as it is being rolled up into the header portion of a glass run channel of the door. While prior art constructions were attempted, generally the constructions had problems in that often times the weatherstrip itself would be pushed into the glass run channel during the rolling up and securing of the windows. Thus, in prior constructions, while a chamfered edge strip could be utilized in the 'B' pillar, the 'B' pillar strip had to be somehow terminated and another type of strip would be utilized for the header portion in order to have effective sealing at the header portion of the window. Thus, in the past, it was common to utilize a two-piece strip wherein a header strip and a 'B' pillar strip were connected together.

Thus, it has been a goal in the art to provide a glass run weatherstrip which would produce such a chamfered edge in the header portion of a window without the problems caused in the past. It has also been a goal in the art to provide a single piece continuous glass run strip which provides such a chamfered edge and can be utilized throughout the entire window aperture as a one piece continuous strip.

It is therefore an object of the present invention to provide a single piece continuous glass run strip which is useful in the header portion as well as the 'B' pillar area of a door for providing a chamfered edge in a window aperture of a vehicle.

SUMMARY OF THE INVENTION

In accordance with the above goals and objects, the present invention includes a glass run strip to provide an improved surface transition from an outer surface of a window aperture of a vehicle to a slidable window pane. The glass run strip of the present invention includes a core member with a first chamfered forming lip portion extending therefrom. The first lip portion normally extends from the core member in an angular direction adjacent the outer surface of the vehicle for forming a chamfered transition surface between the outer surface and the window pane area. The lip portion is flexible at least at its attachment to the core member. A means for deflecting the window pane during movement of the window pane relative to the strip is provided. The deflection allows for the first chamfer forming lip to obtain its normal chamfer position with respect to the window pane.

Further objects and advantages of the present invention will become apparent to those skilled in the art in light of the description of the appended claims when taken in conjunction with the accompanying drawings.

DESCRIPTION OF THE PREFERRED EMBODIMENTS

Figure 1:
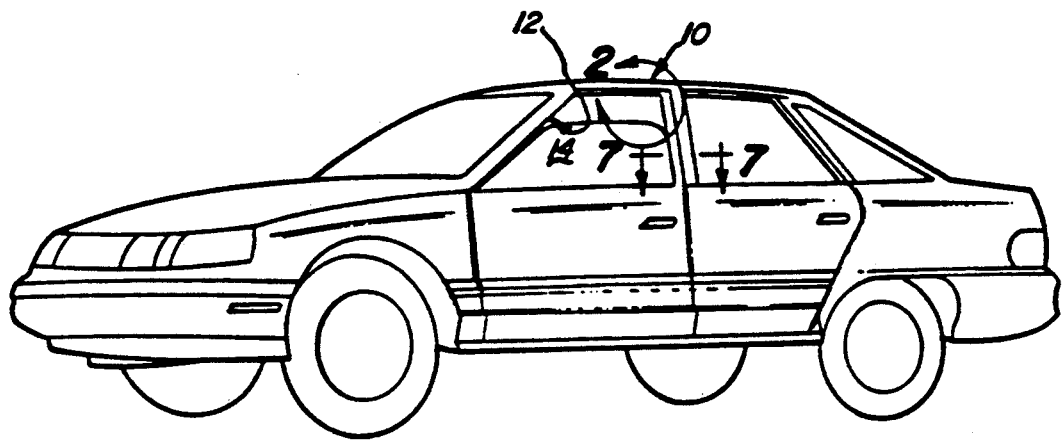
FIG. 1 is an overall perspective view of a vehicle having the glass run strip of the present invention incorporated therein in a window aperture.
Figure 2:
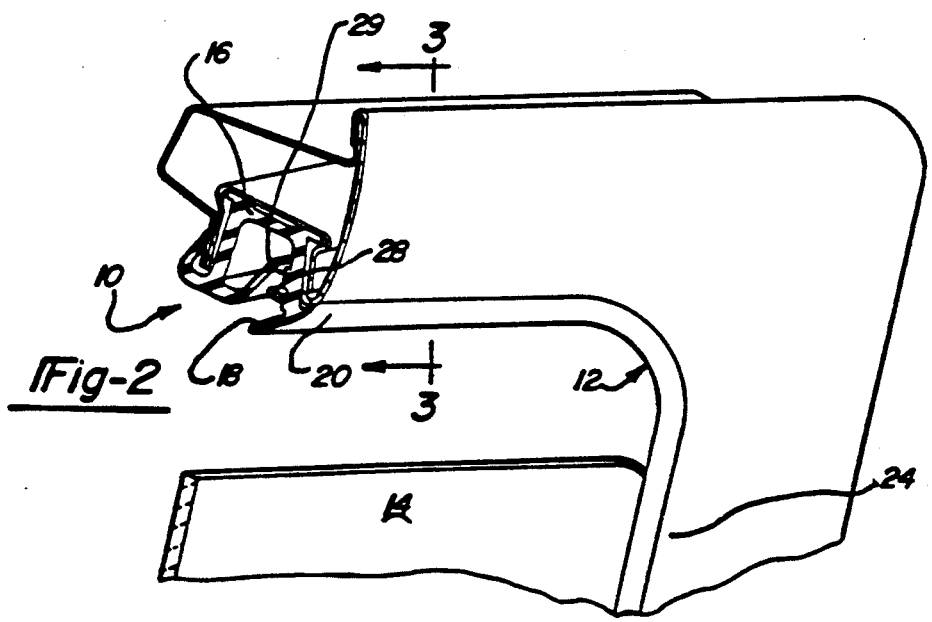
FIG. 2 is a detailed perspective view, partially in section, showing the area indicated by the numeral 2.
Figure 3:
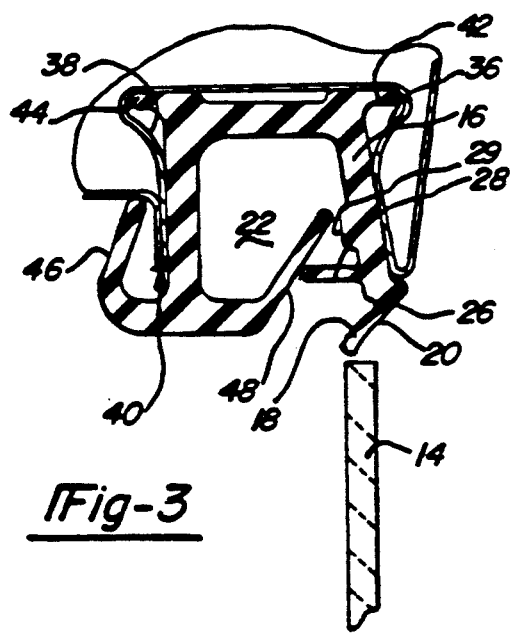
FIG. 3 is a sectional view taken along line 3—3 of FIG. 2 showing the glass run strip of the present invention in its header location.

In accordance with the present invention there is provided a glass run strip 10 which provides an improved surface transition from an outer surface of window aperture 12 to a slidable window pane 14. The glass run strip 10 of the present invention includes a core member 16 which has a first lip portion 18 attached thereto.

First lip portion 18 includes a surface 20 which forms a chamfered edge in its normally extending position from the core member 16. Thus, in its normal position the lip 18 extends angularly into the glass run channel, generally indicated at 22, for forming a chamfered transition edge between the outer surface 24 of the door, for instance, and a window pane 14. The first lip portion 18 is connected at its base 26 with a core 16 so that it is the least flexible at the attachment to the core member for deflecting in response to relative movement of a window pane 14 thereover.

Figure 4:
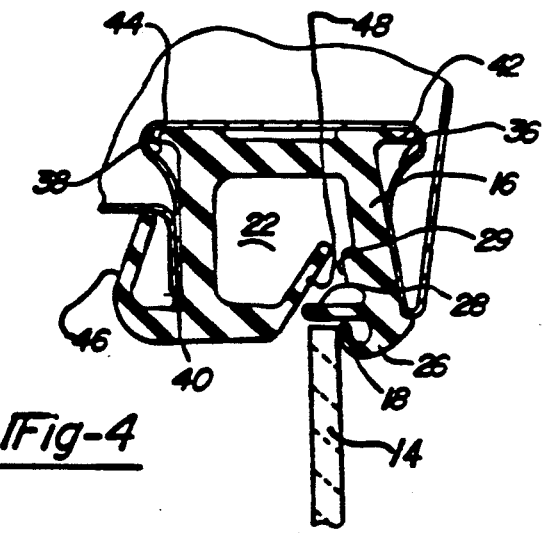
FIG. 4 is a sectional view similar to FIG. 2 showing a window pane passing into the glass run channel over the first lip portion.

A means such as a second lip 28 is provided for deflecting the window pane 14 during relative movement of the window pane relative to the strip 10. The lip 28 provides deflection in the window inboard such that the first chamfered forming lip 18 may be released to attain its normal chamfered position with respect to the window pane, such as shown in FIG. 4. In a preferred embodiment the first lip 18 is positioned such that it interferes with the path of the window and will fold over during contact with the window to guide the window into the glass run channel. This is best shown in FIG. 4. Thus, with the glass run strip construction of the present invention there is no need for a blow out clip or the like structure which has commonly been used in the prior art. Thus, the construction of the present invention has a designed in guidance function. Thus, as seen in FIG. 4, with the window partially inserted into the glass run channel, the lip portion 18 is folded over during the initial insertion of the window into the glass run channel at the header portion.

Figure 5:
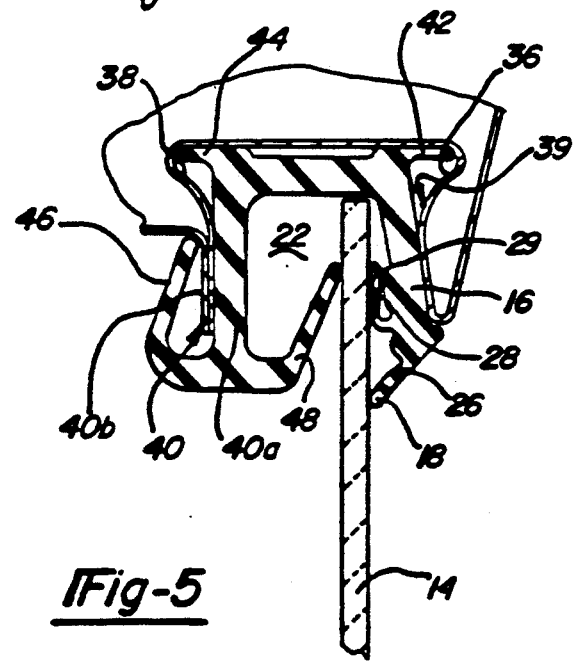
FIG. 5 is a view similar to FIG. 4 showing the window folding over the second lip portion for deflecting the window and allowing the first lip to return to its normally chamfered position.

Referring now to FIG. 5, as the window traverses further into the glass run channel 22 the second lip portion 28 deflects the window until the first lip portion 18 is released from binding on the window and returns to its chamfered edge to form surface 20. A stop protrusion 29 is provided for providing an inner limit to which second lip portion may be folded.

In a preferred embodiment the lip members 18 and 28 have a low friction coating such as a flocking or PTFE coating. Such a coating will help ensure correct operation of the first and second lip portions as described above.

Figure 6:
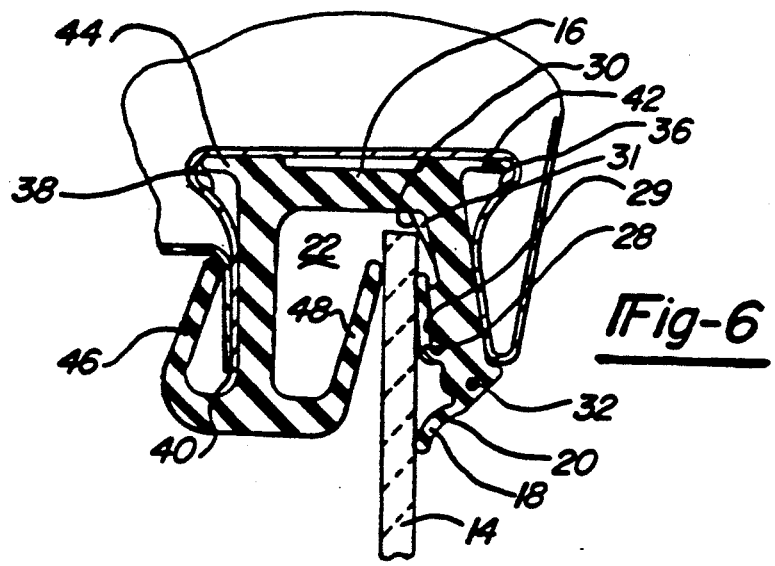
FIG. 6 is a view showing an alternate embodiment of the present invention which includes a ramp for deflecting the window.

Referring now to FIG. 6, in an alternate preferred embodiment of the present invention a ramp surface 30 may also be provided in the weatherstrip of the present invention by a ramp 31 or the like in order to ensure deflection of the window enough to release the first lip portion 18. The ramp surface 30 may be provided to supplement the window deflection provided by the lip 28 or may be utilized to ensure the entire displacement of the window for providing the deflection of the window required to release the first lip portion 18. The ramp may be formed from any suitable material such as rubber or plastic among others. In an alternate embodiment, a wire element 32 may be provided through the length of the glass run strip for reinforcement of the area where lip 28 is attached thereto.

Figure 7:
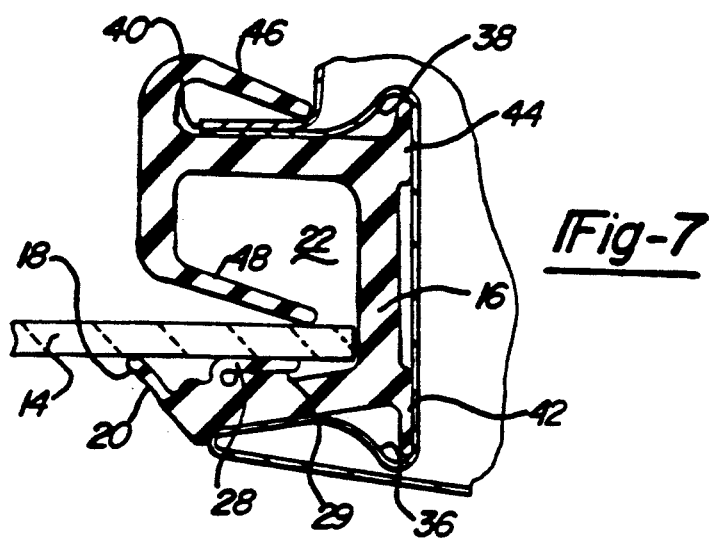
FIG. 7 is a sectional view taken along line 3-3 showing the use of the strip of the present invention in the 'B' pillar portion of the door.

Referring now to FIG. 7, there is shown a sectional view of the 'B' pillar portion of the glass run strip of the present invention. As can be seen therein, the window readily slides up and down the channel without hindering the chamfered surface 20. Thus, the glass run strip of the present invention may be utilized around the entire periphery of the window aperture which reduces production and installation time for such a glass run strip over the prior art constructions.

In the embodiment shown in FIGS. 2 through 7, the glass run strip employing the teachings of the present invention is shown in a conventional application. In such an application the window aperture 12 has a channel 34 which is adapted to support a glass run strip 10. Typically, the channel formed therein has an expanded width at its base for forming locking spaces such as 36 and 38 along the length of the channel. Generally, an end flange 40 is also included in such a window aperture construction by spot welding of the two flange portions 40a and 40b together. The end flange 40 is provided with a first strip 39 which extends from the outer surface 24 of the door. The glass run strip 10 is adapted to be utilized in such a vehicle construction by first providing the flexible locking tab extensions 42 and 44 along the base of the glass run strip. Additionally, finishing lip 46 is provided for enclosing the unsightly portion of end flange 40. An inner sealing lip 48 is also provided for sealing on the inside of the window pane 14. Thus, in this embodiment the strip may be press fit into the glass run channel 34 formed in the window aperture 12 of the door.

Figure 8:
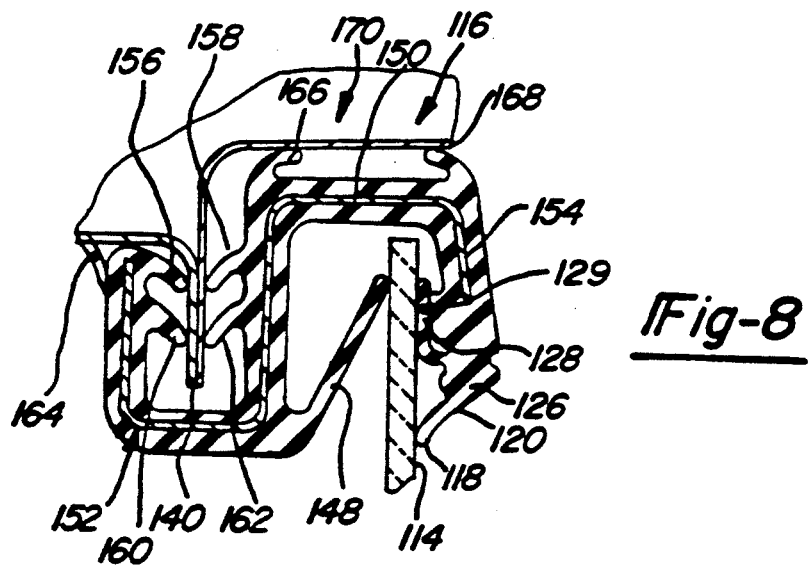
FIG. 8 is a sectional view showing an alternate embodiment of a glass run strip made in accordance with the teachings of the present invention.

Referring now to FIG. 8, wherein like elements are set forth in numbers differing from the previous figures by one hundred, there is shown an alternate embodiment of the glass run structure 110 of the present invention. Glass run 110 differs from the previous structure in that a structural core member 150 is provided in the glass run structure. This embodiment may be utilized when structural rigidity for the glass run strip is desired. For instance, where only an end flange 140 and an associated vehicle surface 170 are found in the window aperture 112, the embodiment shown in FIG. 8 would be useful.

Thus, in this alternate embodiment of the present invention the structural core member 150 includes a 'U' shaped securement portion 152 for securing the glass run structure onto an end flange of a vehicle door. The structural core member 150 also has a glass run forming channel portion 154 which provides structural rigidity for forming the glass run channel for vehicles so configured. The securement portion 152 includes securement lips 156, 158, 160 and 162 to provide securement to an end flange 140. Of course, other securement structures such as clips, fasteners or the like could also be utilized in this embodiment. Sealing lips 164, 166 and 168 are provided for sealing and transition to the vehicle door's surface 170. As will be appreciated by those skilled in that art, this embodiment includes the same novel lip and guidance structure as in the previous embodiment. Thus, lip member 118 is hinged at its base 126 such that it bends and initially displaces the window 114. Second lip 128 is provided for further displacement of the window solely or in conjunction with stop 129 such that the lip 118 may be released to form the desired chamfered edge 120.

While the above description constitutes preferred embodiments of the present invention it is to be appreciated that the invention is susceptible to modification, variation and change without departing from the proper scope and fair meaning of the accompanying claims.

What is claimed is:

1. A glass run strip for providing an improved surface transition from an outer surface of an area about a window aperture of a vehicle to a slidable window pane, said glass run strip comprising:
   a core member;
   a first chamfer forming lip portion normally extending forward said window aperture from said core member in an angular direction adjacent said outer surface for forming a chamfered transition surface between the outer surface and window pane area, said lip portion being flexible at least at its attachment to said core member;
   a means for deflecting the window pane during movement of the window pane relative to the strip, for allowing said first chamfer forming lip portion to attain its normal chamfered position with respect to the window pane upon full insertion of the window into the glass run strip.

2. The glass run strip of claim 1 wherein said means further comprises a second lip portion extending into the glass run channel in an interference relationship with the path of the window pane.

3. The glass run strip of claim 1 wherein said means further comprises a ramp member extending at the base of the core member for providing a ramp surface for deflection of the window pane.

4. The glass run strip of claim 1 wherein a portion of said first lip is in an interference relationship with the path of the window pane such that the hinging of the first lip guides the window pane into the glass run channel.

5. The glass run strip of claim 1 wherein said means comprises a second lip member which is adapted to fold over a stop protrusion for interfering with the path of the window deflection of the window pane.

6. The glass run strip of claim 5 further comprising a ramp surface formed in said strip for ensuring deflection of said window pane.

7. The glass run strip of claim 5 wherein a portion of said first lip is in an interference relationship with the path of the window pane such that the hinging of the first lip guides the window pane into the glass run channel.

8. A glass run channel strip for providing an improved chamfered surface transition from an outer surface of an area about a window aperture of a vehicle to a slidable window pane, said glass run strip comprising:

a core member defining a glass run channel;

a first chamfer forming lip portion normally extending toward said window aperture from the core member in a direction toward the glass run channel and normally positioned at an angle to a window pane, said first lip portion including an outer surface for forming a chamfered surface between the first strip of the end flange and the window pane, said lip portion being under cut at its attachment to the core member for allowing flexible hinging of the lip portion; and a second lip portion extending into the glass run channel, said second lip portion deflecting the window pane during movement of the window pane relative to the glass run strip to an extent which ensures that the first lip portion will return to its normal position for forming the chamfered surface transition.

9. The glass run strip of claim 8 wherein a stop protrusion extends from said core member adjacent the second lip portion for providing a solid stop of movement of the lip inward.

10. The glass run strip of claim 8 wherein said strip is disposed in the header area of the vehicle door opening.

* * * * *

UNITED STATES PATENT AND TRADEMARK OFFICE
CERTIFICATE OF CORRECTION

PATENT NO. : 5,217,786
DATED : June 8, 1993
INVENTOR(S) : James F. Keys

It is certified that error appears in the above-indentified patent and that said Letters Patent is hereby corrected as shown below:

Abstract, line 16, "extend" should be --extent--

Column 4, line 43, claim 1, "forward" should be --toward--

Signed and Sealed this

Twenty-second Day of March, 1994

Attest:

BRUCE LEHMAN

Attesting Officer     Commissioner of Patents and Trademarks